US012743582B2

(12) United States Patent
Panda et al.

(10) Patent No.: US 12,743,582 B2
(45) Date of Patent: Sep. 22, 2026

(54) DYNAMIC VOCABULARIES FOR CONDITIONING A LANGUAGE MODEL FOR TRANSFORMING NATURAL LANGUAGE TO A LOGICAL FORM

(71) Applicant: Oracle International Corporation, Redwood Shores, CA (US)

(72) Inventors: Srikant Panda, Bangalore (IN); Amit Agarwal, Kolkata (IN); Kulbhushan Pachauri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 227 days.

(21) Appl. No.: 18/419,896

(22) Filed: Jan. 23, 2024

(65) Prior Publication Data

US 2025/0238614 A1 Jul. 24, 2025

(51) Int. Cl.

*G06F 40/284* (2020.01)
*G06F 16/2455* (2019.01)
*G06F 40/205* (2020.01)
*G06F 40/295* (2020.01)
*G06F 40/35* (2020.01)

(52) U.S. Cl.

CPC ........ *G06F 40/284* (2020.01); *G06F 16/2455* (2019.01); *G06F 40/295* (2020.01); *G06F 40/35* (2020.01); *G06F 40/205* (2020.01)

(58) Field of Classification Search

CPC ...... G06F 16/00; G06F 16/2455; G06F 40/00; G06F 40/35; G06F 40/284; G06F 40/205; G06F 40/295

See application file for complete search history.

(56) References Cited

U.S. PATENT DOCUMENTS

2024/0362212 A1* 10/2024 Sun .................. G06F 16/24522

OTHER PUBLICATIONS

Yu, T., Zhang, R., Er, H.Y., Li, S., Xue, E., Pang, B., Lin, X.V., Tan, Y.C., Shi, T., Li, Z. and Jiang, Y., 2019. Cosql: A conversational text-to-sql challenge towards cross-domain natural language interfaces to databases. arXiv preprint arXiv:1909.05378 (Year: 2019).*

(Continued)

*Primary Examiner* — Sean E Serraguard

(74) *Attorney, Agent, or Firm* — Kilpatrick Townsend & Stockton LLP

(57) ABSTRACT

Techniques are disclosed herein for generating dynamic vocabularies for conditioning a language model. A dynamic vocabulary is constructed from an input prompt, database schema information for a database to be queried, and programming language information for a programming language to be used for querying the database to condition the language model to predict an output statement in the programming language. The dynamic vocabulary can be included in prompt information that is provided to the language model. The number of tokens in the dynamic vocabulary can be different than a number of tokens included in a vocabulary of the language model. By utilizing a dynamic vocabulary, the language model can be conditioned to predict tokens for the output statement that are contextually consistent with the tokens included the dynamic vocabulary.

20 Claims, 11 Drawing Sheets

(56) References Cited

OTHER PUBLICATIONS

Kun Zhang, Xiexiong Lin, Yuanzhuo Wang, Xin Zhang, Fei Sun, Cen Jianhe, Hexiang Tan, Xuhui Jiang, and Huawei Shen. 2023. ReFSQL: A Retrieval-Augmentation Framework for Text-to-SQL Generation. In Findings of the Association for Computational Linguistics: EMNLP 2023, pp. 664-673, Singapore. (Year: 2023).*
Katsogiannis-Meimarakis, G. and Koutrika, G., 2023. A survey on deep learning approaches for text-to-SQL. The VLDB Journal, 32(4), pp. 905-936. (Year: 2023).*
Wang, B., Shin, R., Liu, X., Polozov, O. and Richardson, M., Jul. 2020, Rat-sql: Relation-aware schema encoding and linking for text-to-sql parsers. In Proceedings of the 58th annual meeting of the association for computational linguistics (pp. 7567-7578). (Year: 2020).*
Hwang et al., A Comprehensive Exploration on WikiSQL with Table-Aware Word Contextualization, KR2ML Workshop at NeurIPS 2019, Nov. 11, 2019, 34 pages.
Touvron et al., LLaMA: Open and Efficient Foundation Language Models, Computation and Language, Feb. 27, 2023, 27 pages.
Vaswani et al., Attention is All You Need, NIPS, Available online at: https://arxiv.org/pdf/1706.03762.pdf, Aug. 2, 2023, 15 pages.

* cited by examiner

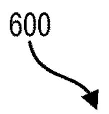
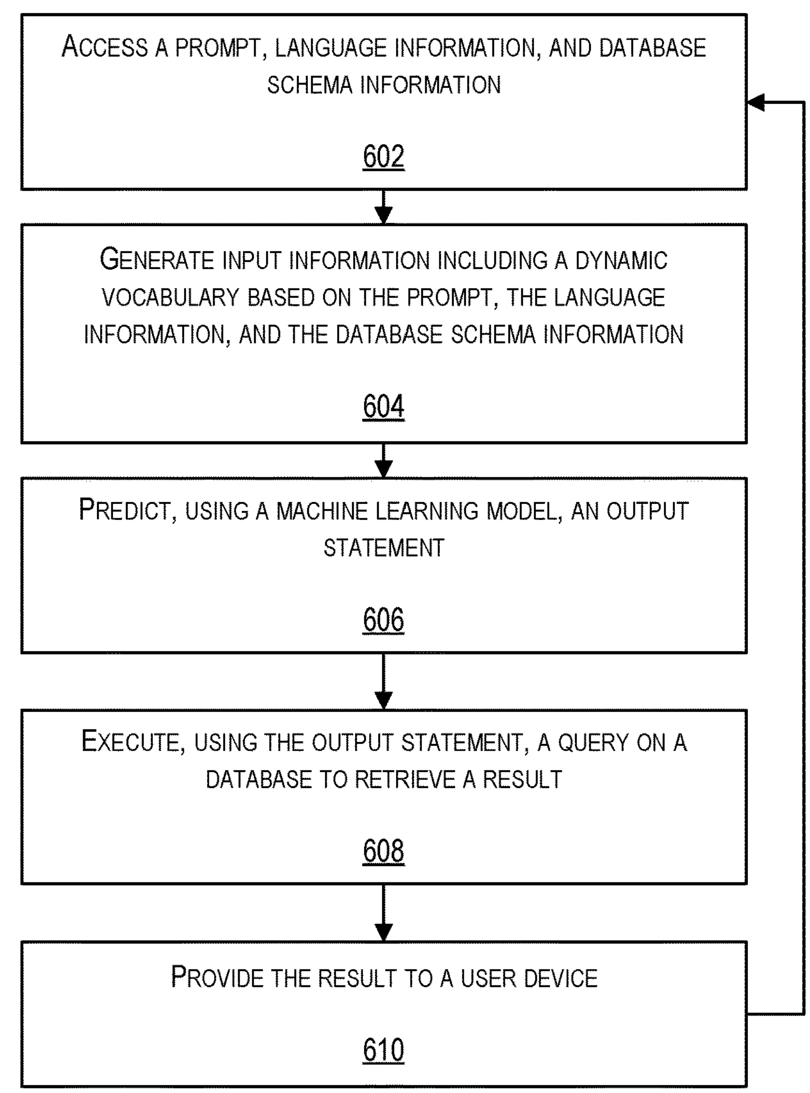
*FIG. 6*

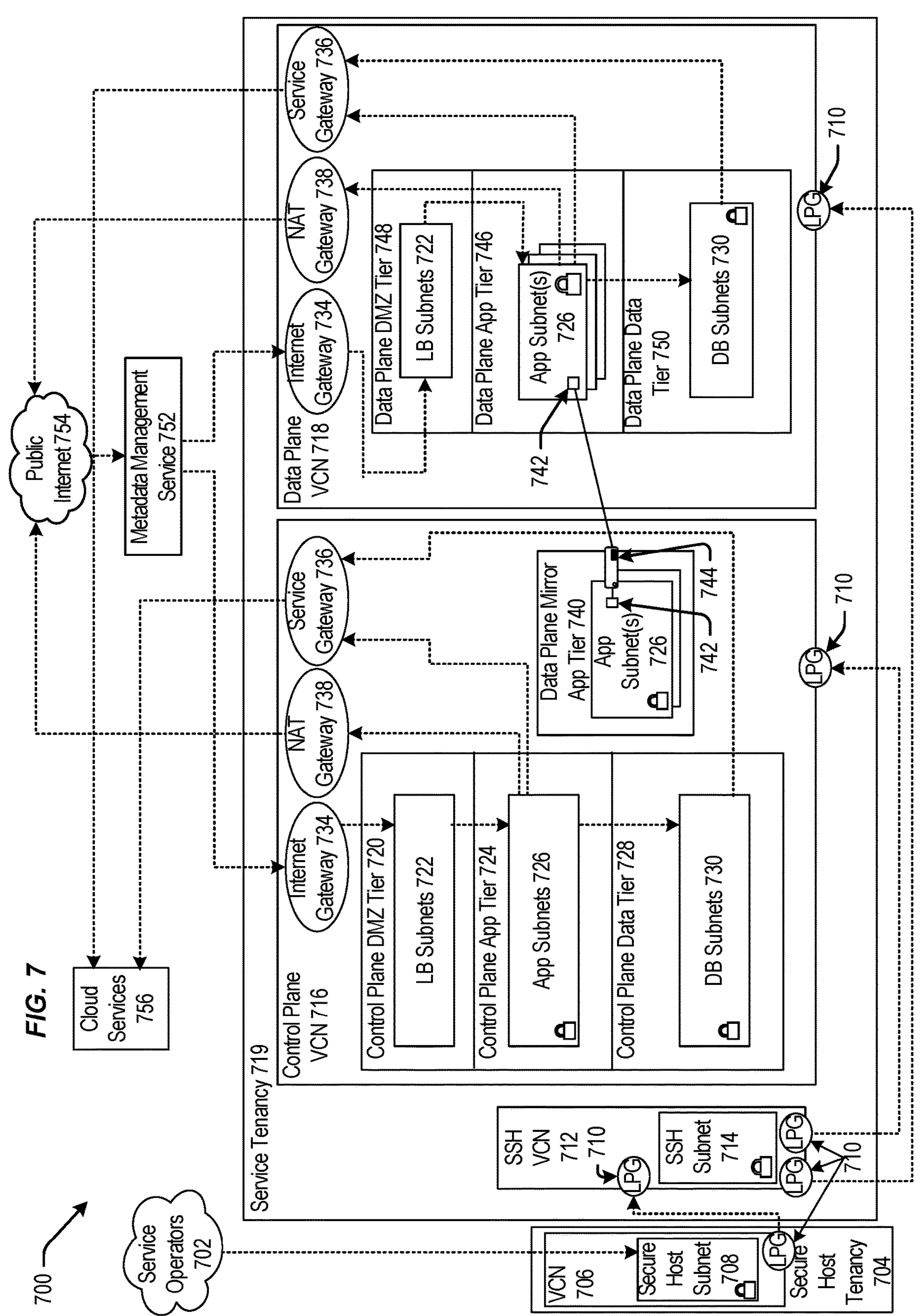
FIG. 7
700
Service Operators 702
Public Internet 754
Metadata Management Service 752
Cloud Services 756
Service Tenancy 719
Control Plane VCN 716
Data Plane VCN 718
Internet Gateway 734
NAT Gateway 738
Service Gateway 736
Control Plane DMZ Tier 720
LB Subnets 722
Control Plane App Tier 724
App Subnets 726
Control Plane Data Tier 728
DB Subnets 730
Data Plane Mirror App Tier 740
App Subnet(s) 726
742
744
Data Plane DMZ Tier 748
Data Plane App Tier 746
App Subnet(s) 726
Data Plane Data Tier 750
DB Subnets 730
LPG
710
SSH VCN 712
SSH Subnet 714
VCN 706
Secure Host Subnet 708
Secure Host Tenancy 704

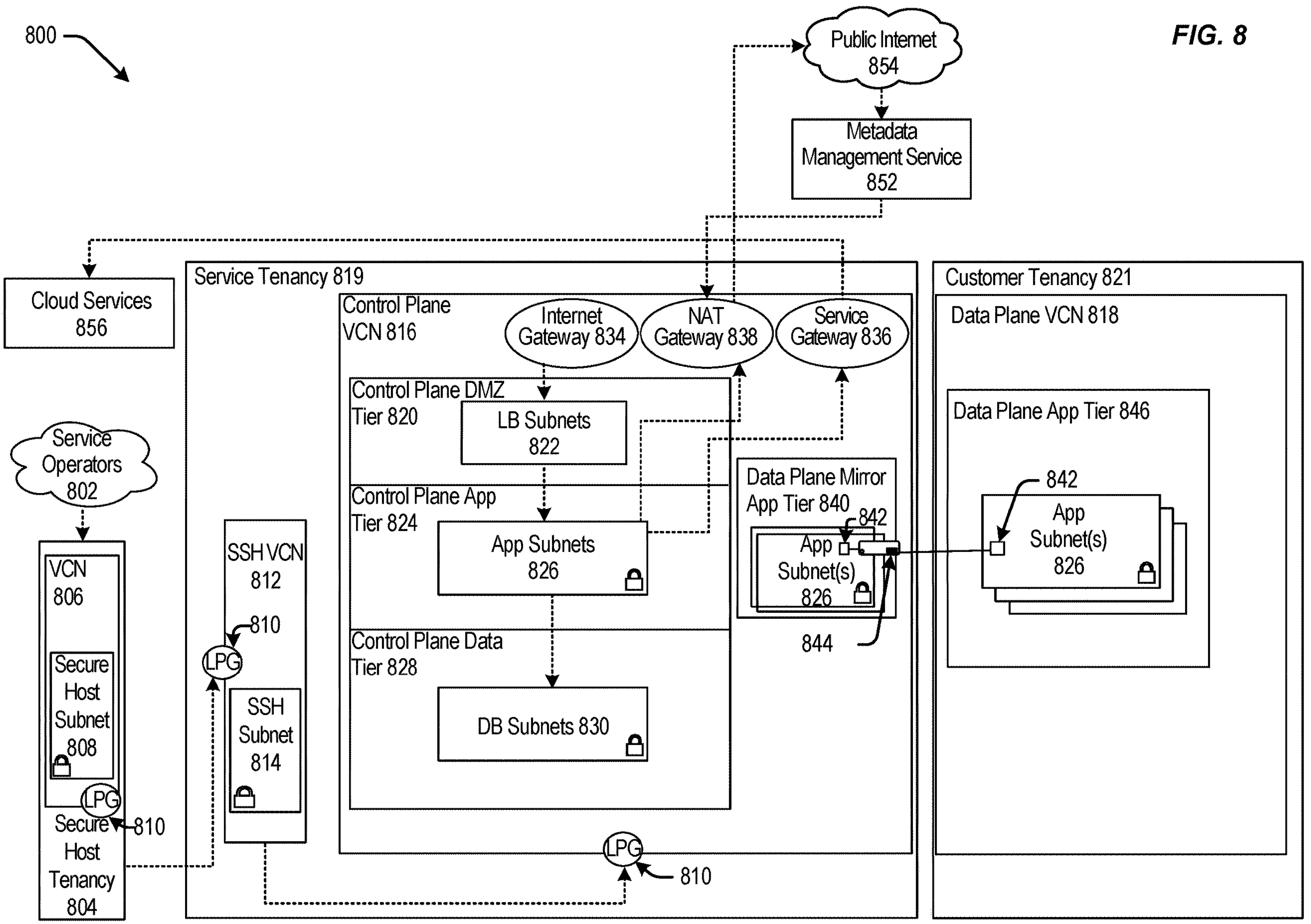
800
FIG. 8
Public Internet 854
Metadata Management Service 852
Cloud Services 856
Service Tenancy 819
Control Plane VCN 816
Internet Gateway 834
NAT Gateway 838
Service Gateway 836
Control Plane DMZ Tier 820
LB Subnets 822
Control Plane App Tier 824
App Subnets 826
Control Plane Data Tier 828
DB Subnets 830
Data Plane Mirror App Tier 840
842
App Subnet(s) 826
844
Customer Tenancy 821
Data Plane VCN 818
Data Plane App Tier 846
842
App Subnet(s) 826
Service Operators 802
VCN 806
Secure Host Subnet 808
LPG
Secure Host Tenancy 804
810
SSH VCN 812
810
LPG
SSH Subnet 814
LPG
810

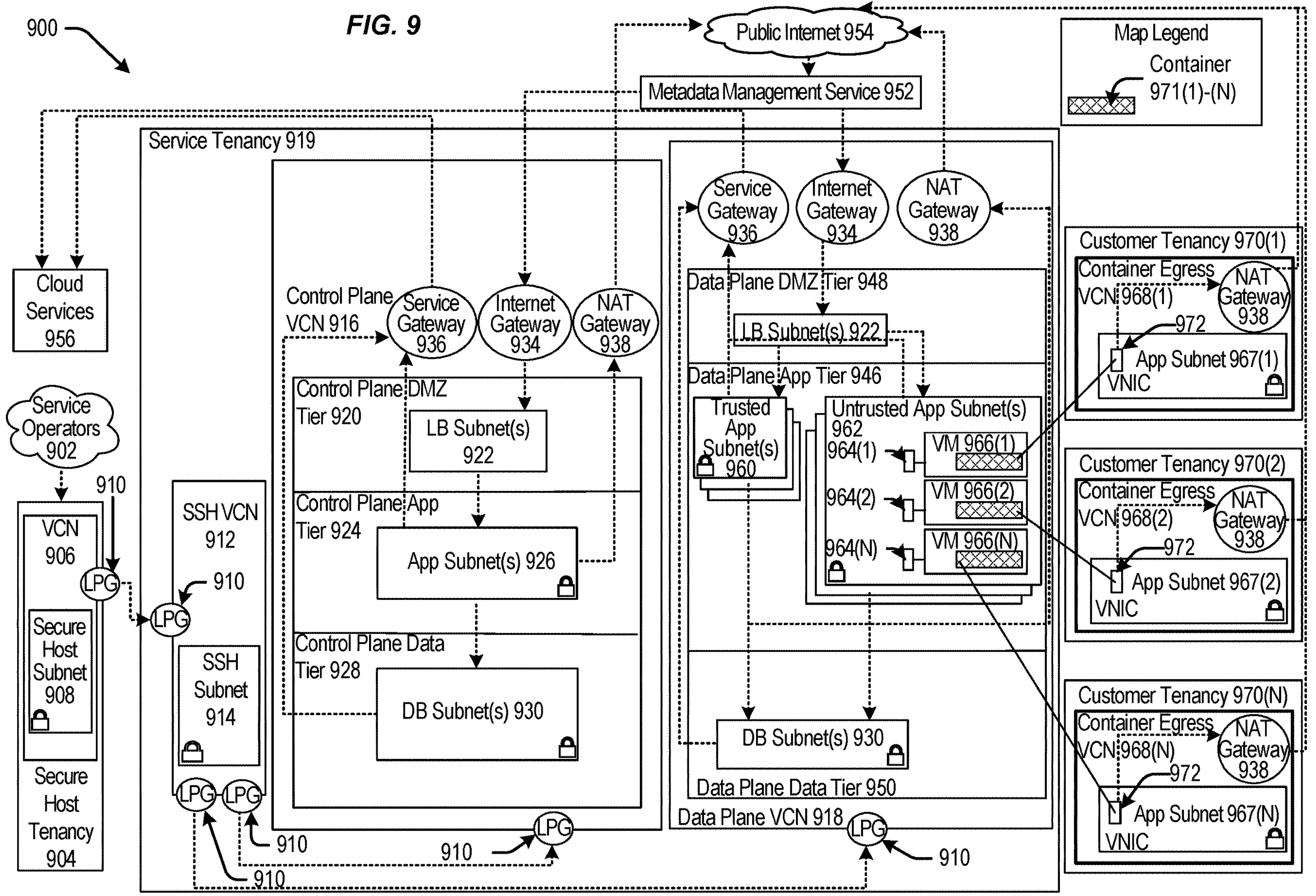
900
FIG. 9
Public Internet 954
Metadata Management Service 952
Map Legend
Container
971(1)-(N)
Cloud Services 956
Service Operators 902
VCN 906
LPG
910
Secure Host Subnet 908
Secure Host Tenancy 904
Service Tenancy 919
SSH VCN 912
SSH Subnet 914
Control Plane VCN 916
Service Gateway 936
Internet Gateway 934
NAT Gateway 938
Control Plane DMZ Tier 920
LB Subnet(s) 922
Control Plane App Tier 924
App Subnet(s) 926
Control Plane Data Tier 928
DB Subnet(s) 930
Data Plane DMZ Tier 948
LB Subnet(s) 922
Data Plane App Tier 946
Trusted App Subnet(s) 960
Untrusted App Subnet(s) 962
964(1)
964(2)
964(N)
VM 966(1)
VM 966(2)
VM 966(N)
DB Subnet(s) 930
Data Plane Data Tier 950
Data Plane VCN 918
Customer Tenancy 970(1)
Container Egress VCN 968(1)
972
App Subnet 967(1)
VNIC
Customer Tenancy 970(2)
Container Egress VCN 968(2)
App Subnet 967(2)
Customer Tenancy 970(N)
Container Egress VCN 968(N)
App Subnet 967(N)

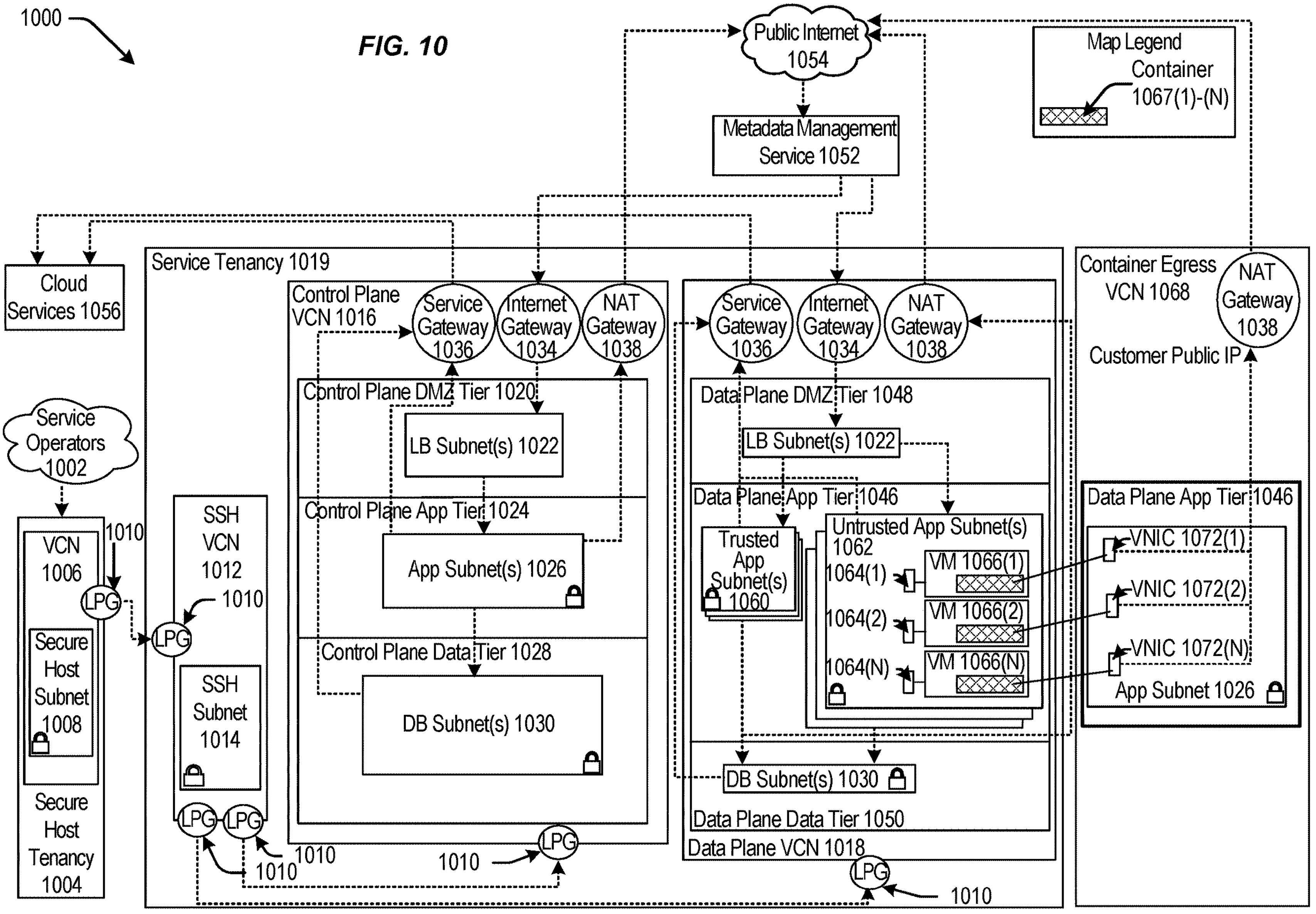
1000
FIG. 10
Public Internet
1054
Map Legend
Container
1067(1)-(N)
Metadata Management
Service 1052
Cloud
Services 1056
Service Tenancy 1019
Control Plane
VCN 1016
Service
Gateway
1036
Internet
Gateway
1034
NAT
Gateway
1038
Container Egress
VCN 1068
Customer Public IP
Service
Operators
1002
Control Plane DMZ Tier 1020
LB Subnet(s) 1022
Data Plane DMZ Tier 1048
Data Plane App Tier 1046
VCN
1006
SSH
VCN
1012
Control Plane App Tier 1024
App Subnet(s) 1026
Trusted
App
Subnet(s)
1060
Untrusted App Subnet(s)
1062
1064(1)
1064(2)
1064(N)
VM 1066(1)
VM 1066(2)
VM 1066(N)
VNIC 1072(1)
VNIC 1072(2)
VNIC 1072(N)
App Subnet 1026
LPG
1010
Secure
Host
Subnet
1008
SSH
Subnet
1014
Control Plane Data Tier 1028
DB Subnet(s) 1030
Data Plane Data Tier 1050
Data Plane VCN 1018
Secure
Host
Tenancy
1004

DYNAMIC VOCABULARIES FOR CONDITIONING A LANGUAGE MODEL FOR TRANSFORMING NATURAL LANGUAGE TO A LOGICAL FORM

FIELD

The present disclosure generally relates to transforming natural language to a logical form, and more particularly, to generating dynamic vocabularies for conditioning a language model for transforming natural language to a logical form.

BACKGROUND

Structured Query Language (SQL) is a domain-specific language used in programming and designed for managing data held in a relational database management system (RDBMS), or for stream processing in a relational data stream management system (RDSMS). It is particularly useful in handling structured data (i.e., data incorporating relations among entities and variables). SQL includes sublanguages such as a data query language (DQL), a data definition language (DDL), a data control language (DCL), and a data manipulation language (DML). The scope of SQL includes data query, data manipulation (insert, update, and delete), data definition (schema creation and modification), and data access control. Although SQL is essentially a declarative language (4GL), it also includes procedural elements. In order to effectively leverage data, RDBMS and RDSMS users are required to not only have prior knowledge about the database schema (e.g., table and column names) but also a working understanding of the syntax and semantics of SQL. Nonetheless, despite its expressiveness, SQL can often hinder non-technical users from exploring and making use of their data.

Natural language is an alternative interface to data held or implemented in RDBMS and RDSMS because it allows non-technical users to formulate complex questions in a more concise manner than SQL. Using semantic parsing, natural language statements, requests, and questions can be transformed into logical forms or meaning representations that can be executed by an application (e.g., model, program, machine, etc.). For example, semantic parsing can transform natural language sentences directly into general purpose programming languages such as Python, Java, and SQL. Processes for transforming natural language sentences to SQL queries typically include rule-based, statistical-based, and deep learning-based systems. Rule-based systems typically use a series of fixed rules to translate the natural language sentences to SQL queries. Rule-based systems are generally domain-specific and, thus, are considered inelastic and do not generalize well to new use cases (e.g., across different domains). Statistical-based systems label tokens (i.e., words or phrases) in an input natural language sentence according to their semantic role in the sentence and use the labels to fill slots in the SQL query but have limitations on the types of sentences that can be parsed (e.g., a sentence must be able to be represented as a parse tree). Deep learning-based systems, such as sequence-to-sequence models, involve training deep learning models that directly translate the natural language sentences to SQL queries and have been shown to generalize well to new use cases.

BRIEF SUMMARY

Techniques are disclosed herein for generating dynamic vocabularies for conditioning a language model for transforming natural language to a logical form.

In some embodiments, a computer-implemented method includes generating, by a computing system, input information for a machine learning model configured to predict a statement, wherein the input information includes an input prompt and a set of tokens, and wherein the set of tokens includes one or more tokens associated with a programming language, one or more tokens associated with database schema information, and one or more tokens associated with at least one condition of the input prompt; predicting, by the computing system and using the machine learning model, an output statement for the input prompt based at least in part on the input information, wherein the output statement includes a plurality of tokens, and wherein at least one token of the plurality of tokens is selected from the set of tokens; executing, by the computing system and using the output statement, a query on a database associated with the database schema information to retrieve a result for the query; and providing, by the computing system, the result for the query to a user device.

In some embodiments, the input information is first input information, wherein the input prompt is a first input prompt, wherein the set of tokens is a first set of tokens, wherein the database schema information is first database schema information, wherein the output statement is a first output statement, and wherein the plurality of tokens is a first plurality of tokens, the method further includes: generating, by the computing system, second input information for the machine learning model, wherein the second input information includes a second input prompt and a second set of tokens, and wherein the second set of tokens includes one or more tokens associated with the programming language, one or more tokens associated with second database schema information, and one or more tokens associated with at least one condition of the second input prompt; and predicting, by the computing system and using the machine learning model, a second output statement for the second input prompt based at least in part on the second input information, wherein the second output statement includes a second plurality of tokens, and wherein at least one token of the second plurality of tokens is selected from the second set of tokens.

In some embodiments, a number of tokens included in the first set of tokens is different from a number of tokens in the second set of tokens.

In some embodiments, the machine learning model includes a vocabulary, and wherein a number of tokens included in the set of tokens is less than a number of tokens included in the vocabulary.

In some embodiments, at least one token of the one or more tokens associated with the at least one condition of the input prompt corresponds to a term included in the input prompt.

In some embodiments, at least one token of the one or more tokens associated with the at least one condition of the input prompt is generated using a rules-based approach and/or a named-entity recognition-based approach.

In some embodiments, the providing the result for the query to the user device includes incorporating the result for the query in a dialog between the user device and a skill bot and presenting the dialog on a display of the user device.

Some embodiments include a system that includes one or more processors; and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 is an example of a process for generating prompt information for conditioning a language model for transforming natural language to a logical form according to certain embodiments.

FIG. 7 is a block diagram illustrating one pattern for implementing a cloud infrastructure as a service system according to certain embodiments.

FIG. 8 is a block diagram illustrating another pattern for implementing a cloud infrastructure as a service system according to certain embodiments.

FIG. 9 is a block diagram illustrating another pattern for implementing a cloud infrastructure as a service system according to certain embodiments.

FIG. 10 is a block diagram illustrating another pattern for implementing a cloud infrastructure as a service system according to certain embodiments.

DETAILED DESCRIPTION

Figure 1:
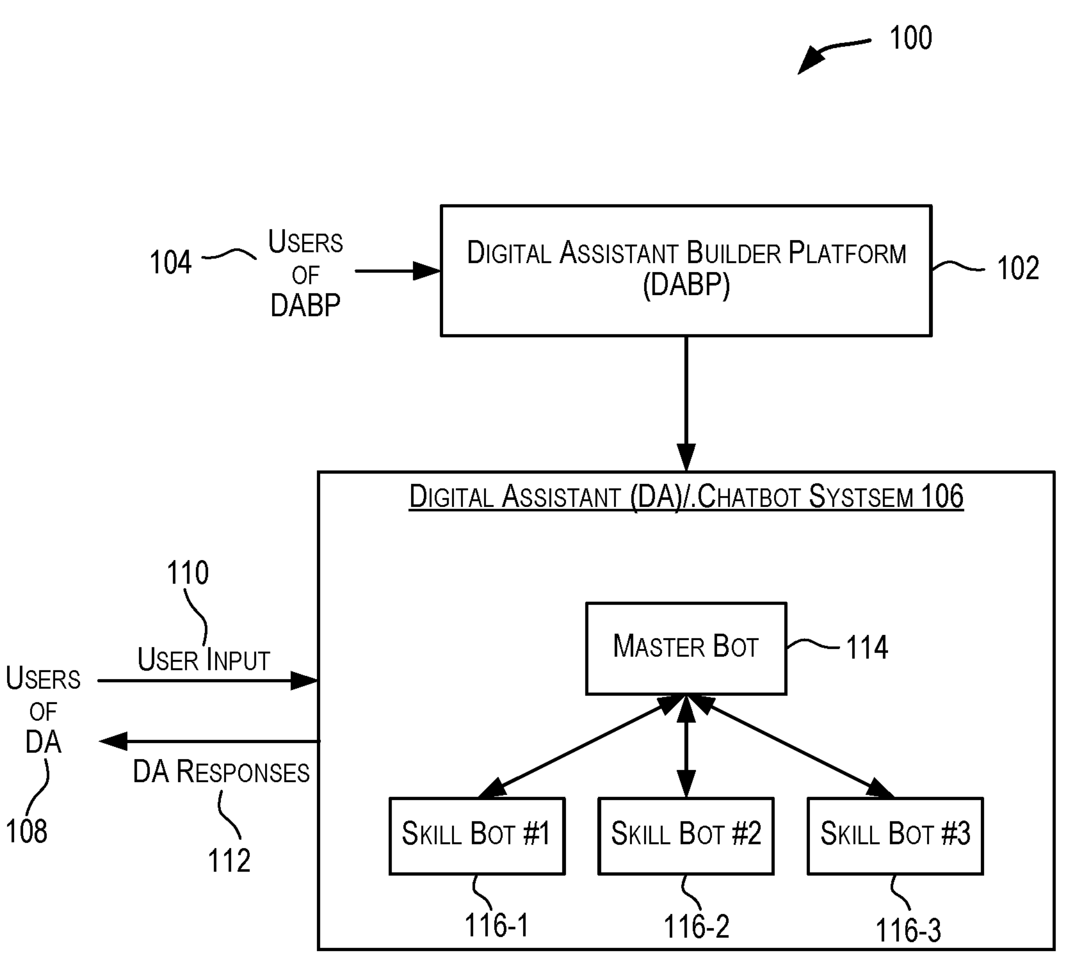
FIG. 1 is a simplified block diagram of a distributed environment incorporating according to certain embodiments.

In recent years, the amount of data powering different industries, and their systems has been increasing exponentially. The majority of business information is managed by relational databases that store, process, and retrieve data. Databases power information systems across multiple industries including retail (e.g., orders, cancellations, refunds), supply chain (e.g., raw materials, stocks, vendors), healthcare (e.g., medical records), and finance (e.g., financial business metrics) to name a few. Additionally, databases power customer support mechanisms, Internet search engines and knowledge bases, and much more. It is imperative for modern data-driven companies to track, in real-time, the states of their companies and their businesses in order to quickly understand and diagnose any emerging issues, trends, or anomalies and take corrective actions. This tracking is usually performed manually by business analysts interfacing with databases using complex queries in declarative query languages like Structured Query Language (SQL).

Although SQL queries that address fundamental business metrics are common, predefined, and incorporated in commercial products that power insights into business metrics, other non-fundamental business metrics or follow-up business metrics may need to be manually coded by the analysts. Such static interactions between database queries and consumption of the corresponding results may require time-consuming manual intervention and result in slow feedback cycles. It is vastly more efficient to have non-technical business leaders directly interact with the analytics tables via natural language queries that abstract away the underlying SQL code. Defining a SQL query may require a strong understanding of database schema and SQL syntax and can quickly get overwhelming for beginners and non-technical stakeholders. Efforts to bridge this communication gap have led to the development of a new type of processing called Natural Language Interface to Database (NLIDB). NLIDB allows users to access database information using natural language inquiries. This natural language database search capability has become more popular over recent years and, as such, companies are developing deep learning approaches for accessing specific databases using natural language. One such approach is natural language to SQL (NL2SQL). NL2SQL seeks to transform natural language statements, requests, and questions (i.e., sentences) to SQL queries so that individuals, including those unfamiliar with SQL, can run unstructured queries against databases. Additionally, NL2SQL also enables digital assistants, such as chatbots, and other similar computational devices interacting with users to improve their responses when an answer or response to a query can be found in different databases with different schema.

Transformer-based language models (LMs) have resulted in significant progress in natural language processing tasks such as text-to-code (e.g., text-to-SQL), text generation and translation, and sentiment analysis. Due to their attention mechanisms and deep neural architectures, LMs excel at capturing nuanced language patterns and correlations in massive volumes of text data. LMs are designed to predict the next word or token in a sequence of text by computing a probability distribution over a fixed vocabulary for the next token based on the context of the preceding tokens. The prediction is achieved through a series of self-attention mechanisms incorporated in the LMs that assign varying degrees of importance to different parts of the input sequence that enable the LMs to make informed predictions. LMs generate contextually appropriate and coherent text by learning a fixed vocabulary from enormous text corpora and predicting which token included in the fixed vocabulary should be the next token in an output sequence.

To facilitate wide applicability, LMs are often trained on enormous amounts unannotated data, which results in large, fixed vocabularies (e.g., a vocabulary of 32,000 tokens). However, LMs due in part to the size of these vocabularies, LMs tend to suffer from hallucinations. Hallucinations in the context of LMs relate to the creation of content (e.g., text, SQL queries, etc.) that is neither correct nor factual but appears to be believable within the context of the input. These incorrect outputs frequently stray from the expected content and/or include fictitious information that is not present in the input text. LMs with such large vocabularies also tend to be sensitive to the phrasing of the input and/or minor modifications in the phrasing of the input from sequence to sequence, which can result in incorrect and inconsistent output sequences.

To reduce hallucinations and increase robustness, LMs trained on enormous amount of unannotated data are often fine-tuned and conditioned for a particular domain and/or use case using additional training data. For example, in the context of a domain-specific use case such as text-to-SQL query conversion, the training data typically also includes a large number of text-to-SQL and SQL-to-text examples. However, even when an LM is trained and focused on a domain-specific use case, its performance still tends to suffer from hallucinations and robustness due in part to its vast vocabulary. For example, in the case of text-to-SQL query conversion, SQL queries generated by the LM, while valid, may not be related to the user's goal or the underlying database structure. In another example, the SQL queries generated by the LM may query non-existent SQL tables, include non-existent database attributes, and/or use incorrect syntax. As a result, erroneous query execution, failed data retrieval, and decreased query accuracy may occur.

Techniques such as one-shot prompting, few-shot prompting, context injection, grounding, and prompt augmentation have shown promising results in reducing hallucinations, increasing robustness, and boosting overall performance by guiding and/or conditioning a LM's output. However, even using these techniques, the probability distribution for the next token generated by the LM is still based on a large, fixed vocabulary, which, as discussed above, often results in undesired outputs.

Accordingly, a different approach is needed to address these challenges and others. The techniques described herein utilize an evolving vocabulary (referred to herein as a "dynamic vocabulary") that leverages domain-specific information such as SQL features, database information, and filter conditions to condition the LM and improve the generation of SQL statements from natural language prompts. In one particular aspect, a computer-implemented method includes generating, by a computing system, input information for a machine learning model configured to predict a statement, wherein the input information includes an input prompt and a set of tokens, and wherein the set of tokens includes one or more tokens associated with a programming language, one or more tokens associated with database schema information, and one or more tokens associated with at least one condition of the input prompt; predicting, by the computing system and using the machine learning model, an output statement for the input prompt based at least in part on the input information, wherein the output statement includes a plurality of tokens, and wherein at least one token of the plurality of tokens is selected from the set of tokens; executing, by the computing system and using the output statement, a query on a database associated with the database schema information to retrieve a result for the query; and providing, by the computing system, the result for the query to a user device.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bots to communicate with end users through a messaging application. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, the bot may be associated with a Uniform Resource Identifier (URI). The URI may identify the bot using a string of characters. The URI may be used as a webhook for one or more messaging application systems. The URI may include, for example, a Uniform Resource Locator (URL) or a Uniform Resource Name (URN). The bot may be designed to receive a message (e.g., a hypertext transfer protocol (HTTP) post call message) from a messaging application system. The HTTP post call message may be directed to the URI from the messaging application system. In some examples, the message may be different from a HTTP post call message. For example, the bot may receive a message from a Short Message Service (SMS). While discussion herein refers to communications that the bot receives as a message, it should be understood that the message may be an HTTP post call message, a SMS message, or any other type of communication between two systems.

End users interact with the bot through conversational interactions (sometimes referred to as a conversational user interface (UI)), just as end users interact with other people. In some cases, the conversational interactions may include the end user saying "Hello" to the bot and the bot responding with a "Hi" and asking the end user how it can help. End users also interact with the bot through other types of interactions, such as transactional interactions (e.g., with a banking bot that is at least trained to transfer money from one account to another), informational interactions (e.g., with a human resources bot that is at least trained check the remaining vacation hours the user has), and/or retail interactions (e.g., with a retail bot that is at least trained for discussing returning purchased goods or seeking technical support).

In some examples, the bot may intelligently handle end user interactions without intervention by an administrator or developer of the bot. For example, an end user may send one or more messages to the bot in order to achieve a desired goal. A message may include certain content, such as text, emojis, audio, image, video, or other method of conveying a message. In some examples, the bot may automatically convert content into a standardized form and generate a natural language response. The bot may also automatically prompt the end user for additional input parameters or request other additional information. In some examples, the bot may also initiate communication with the end user, rather than passively responding to end user utterances.

A conversation with a bot may follow a specific conversation flow including multiple states. The flow may define what would happen next based on an input. In some examples, a state machine that includes user defined states (e.g., end user intents) and actions to take in the states or from state to state may be used to implement the bot. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage the bot in a conversation to order pizza, where the user's intent would be represented through the utterance "order pizza." A user intent can be directed to a particular task that the user wishes the bot to perform on behalf of the user. Therefore, utterances reflecting the user's intent can be phrased as questions, commands, requests, and the like.

In the context of the configuration of the bot, the term "intent" is also used herein to refer to configuration information for mapping a user's utterance to a specific task/action or category of task/action that the bot can perform. In order to distinguish between the intent of an utterance (i.e., a user intent) and the intent of the bot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the bot to enable the intent classifier to subsequently determine whether an input utterance from a user matches the order pizza intent. Bot intents may be associated with one or more dialog flows for starting a conversation with the user and in a certain state. For example, the first message for the order pizza intent could be the question "What kind of pizza would you like?" In addition to associated utterances, bot intents may further comprise named entities that relate to the intent. For example, the order pizza intent could include variables or parameters used to perform the task of ordering pizza (e.g., topping 1, topping 2, pizza type, pizza size, pizza quantity, and the like). The value of an entity is typically obtained through conversing with the user.

FIG. 1 is a simplified block diagram of an environment 100 incorporating a chatbot system according to certain embodiments. Environment 100 includes a digital assistant builder platform (DABP) 102 that enables users 104 of DABP 102 to create and deploy digital assistants or chatbot systems. DABP 102 can be used to create one or more digital assistants (or DAs) or chatbot systems. For example, as shown in FIG. 1, users 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is a tool that helps users of the digital assistant accomplish various tasks through natural language conversations. A digital assistant can be implemented using software only (e.g., the digital assistant is a digital tool implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some examples, a user utterance 110 can be in audio input or speech form, such as when a user says or speaks something that is provided as input to digital assistant 106. The utterances are typically in a language spoken by the user. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some examples, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user of digital assistant 106 or are the results of conversion of input speech utterances to text form. This however is not intended to be limiting or restrictive in any manner.

For example, a user input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some examples, this processing involves a series or pipeline of processing steps including, for example, understanding the meaning of the input utterance, determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining, and reforming the utterance to develop a better understandable form (e.g., logical form) or structure for the utterance. Generating a response may include using NLG techniques.

The NLU processing performed by a digital assistant, such as digital assistant 106, can include various NLP related tasks such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain examples, the NLU processing is performed by digital assistant 106 itself. In some other examples, digital assistant 106 may use other resources to perform portions of the NLU processing. For example, the syntax and structure of an input utterance sentence may be identified by processing the sentence using a parser, a part-of-speech tagger, and/or a NER. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain examples, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, 116-3, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 includes a master bot 114 and skill bots 116-1, 116-2, etc. that are child bots of master bot 114. In certain examples, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, etc. This way the end user or consumer of the digital assistant need only know how to access the digital assistant through the common master bot interface and behind the scenes multiple skill bots are provided for handling the user request.

In certain examples, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain examples, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain examples, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain examples, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain examples, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain examples, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain examples, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill, they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
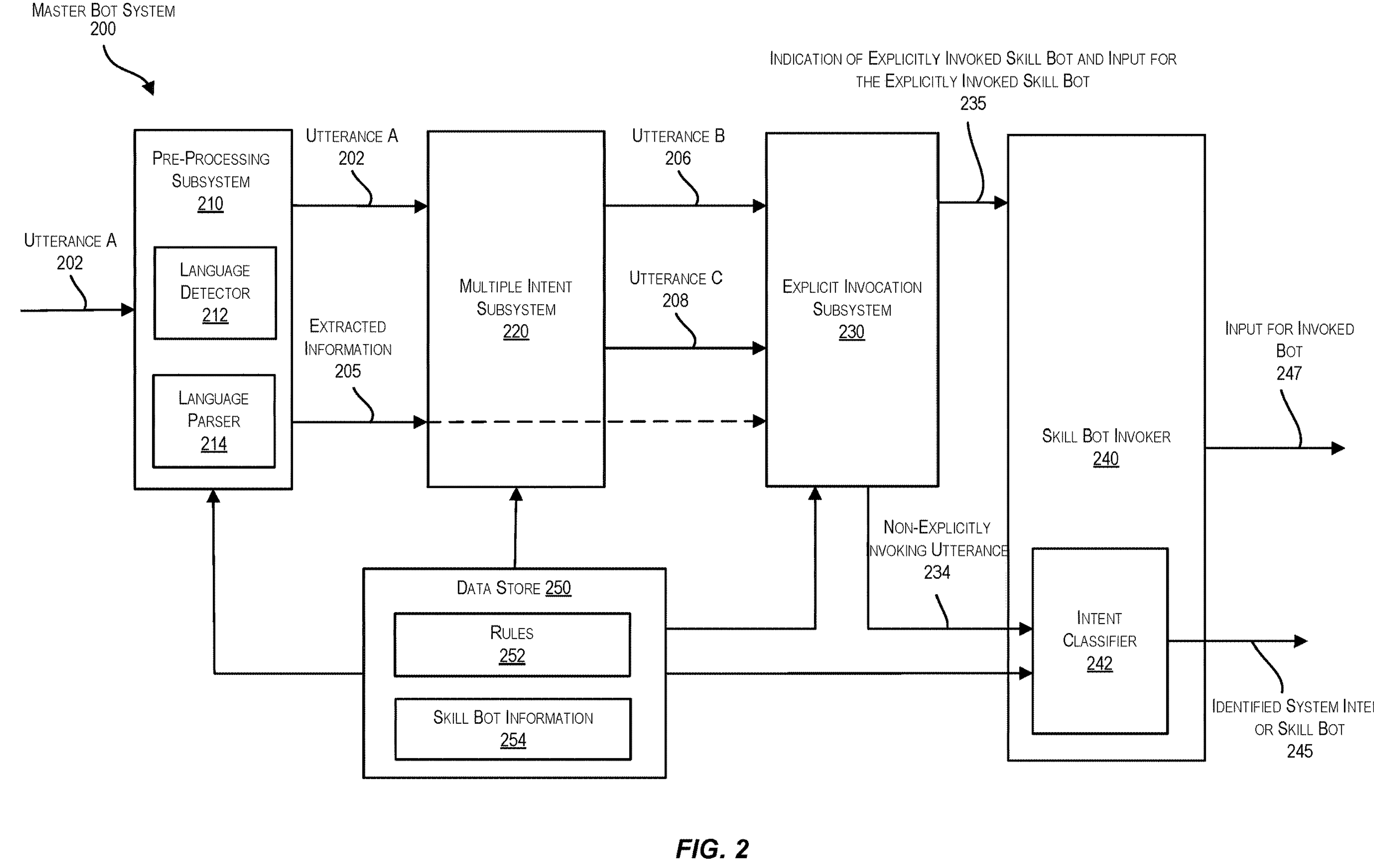
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
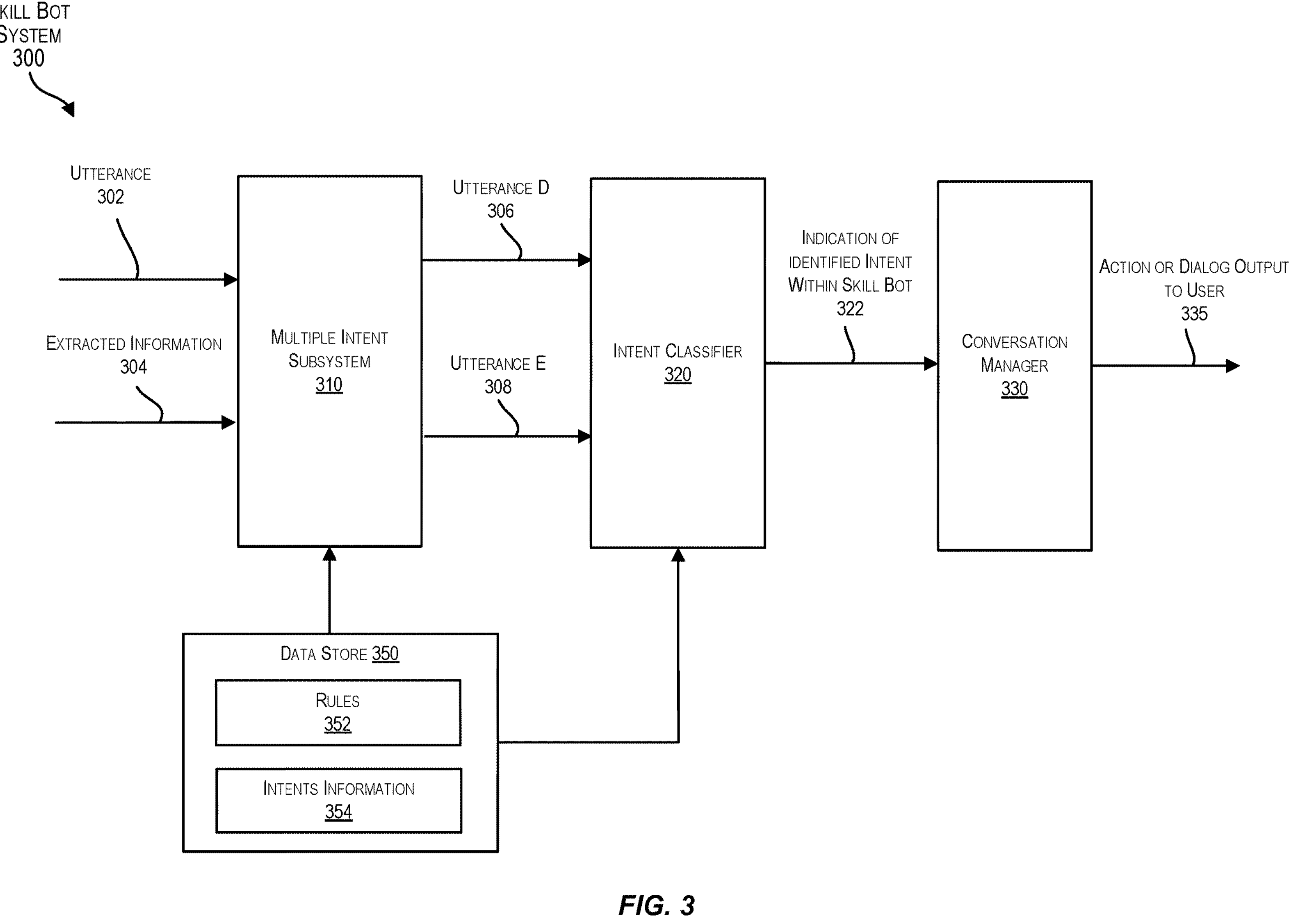
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent (e.g. "Place a pizza order using payment account X, then place a pizza order using payment account Y").

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Dynamic Vocabulary For Conditioning A Language Model

LMs used for text-to-code tasks (e.g., NL2SQL) often have a large, fixed vocabulary of tokens (e.g., 16,000 or 32,000 tokens) and, due in part to the size of these vocabularies can hallucinate (i.e., produce erroneous content) and may not be robust to different kinds of input. Techniques such as one-shot prompting, few-shot prompting, context injection, grounding, and prompt augmentation have shown promising results in reducing hallucinations, increasing robustness, and boosting overall performance by guiding and/or conditioning the LM's output. However, even using these techniques, the probability distribution for the next token in an output sequence of tokens generated by the LM is still based on the large, fixed vocabulary, which often results in less than desirable output sequences. In the case of text-to-SQL conversion, the generated SQL statements can reference non-existent databases and include other errors. As such, queries executed on databases using these generated SQL statements often results in erroneous query execution, failed data retrieval, and decreased query accuracy.

The techniques described herein overcome these challenges and others by utilizing a vocabulary that is dynamic in that it leverages domain-specific information such as SQL features, database schema information, and filter conditions to condition the LM and improve the generation of SQL statements from natural language prompts. The number of tokens included in a dynamic vocabulary can be less than the number of tokens included in the vocabulary of the LM (i.e., the vocabulary established during the training process). Prompt information that includes a prompt along with a dynamic vocabulary for the prompt can be provided to the LM, which in turn can predict tokens for an output statement that are contextually consistent with the tokens included the dynamic vocabulary.

In making the predictions, attention of the LM can be focused away from non-useful tokens (i.e., those not included in the dynamic vocabulary) while attention can be focused on tokens of the dynamic vocabulary. By taking into account the contents of the prompt and the dynamic vocabulary, the LM can be conditioned to predict a next token in an output sequence of tokens based on tokens included in the dynamic vocabulary. Additionally, by focusing on the tokens of the dynamic vocabulary, the space/range of tokens on which the LM pays attention to in making its predictions is reduced, which in turn can increase prediction speed of the LM while limiting the ability of the LM to predict tokens that are inconsistent with the desired domain/use case. Using the techniques described herein, hallucinations can be reduced while model robustness can be improved. As such, accuracy of downstream tasks such as the results from queries executed using these output statements can be improved.

While the techniques described herein are described with particular reference to a text-to-SQL task, it should be understood that the techniques described herein are applicable to other natural language processing tasks such as text to Python, Java, etc., semantic parsing, text generation, sentiment analysis, and the like. In some instances, the techniques described herein can be implemented in a chatbot system, as described with respect to FIGS. 1, 2 and 3. However, it should be understood that the techniques described herein are applicable to other artificial intelligence-based systems including LMs.

Figure 4:
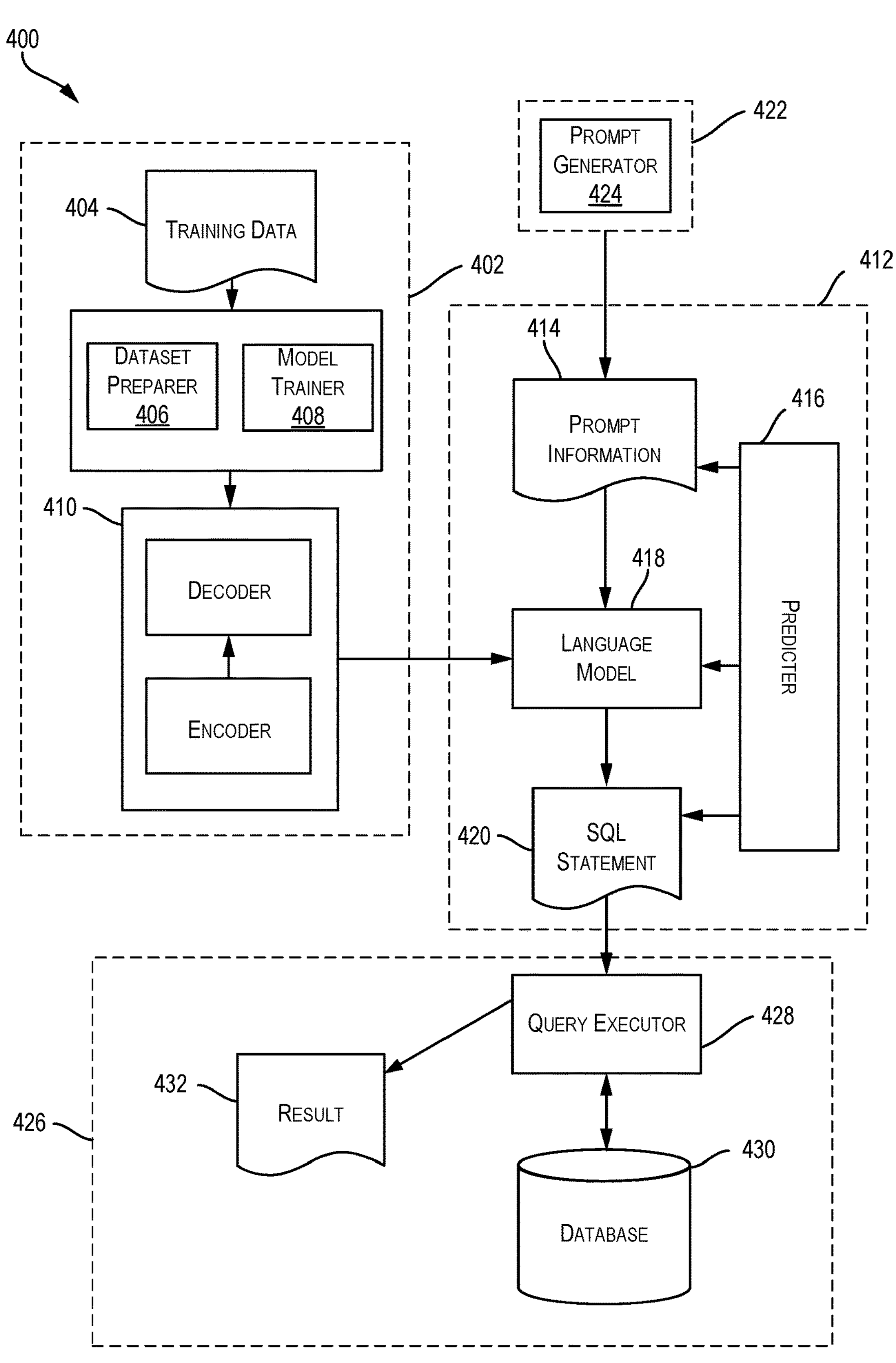
FIG. 4 is a simplified block diagram of a computing system for training and deploying machine learning models according to certain embodiments.

FIG. 4 shows a block diagram illustrating aspects of a computing system 400 that is configured to train and deploy models such as a language model 418, which may be used by a digital assistant or chatbot as described with respect to FIGS. 1-3. The computing system 400 includes a training stage 402 that is configured build and train models for generating SQL statements from natural language prompts, a prompt generation stage 422 that is configured to generate prompt information from the natural language prompts, an inference stage 412 that is configured to predict a SQL statement 420 for the natural language prompt, and a query stage 428 that is configured to execute the SQL statement 420 on a system such as a relational database system.

The training stage 402 includes dataset preparer 406, model trainer 408, and transformer 410. The dataset preparer 406 facilitates the process of loading training data 404, performing pre-processing (e.g., standardization, normalization, cleaning, tokenizing data, annotation, augmentation, embedding, etc.) on the training data 404, and splitting the training data 404 into training and validation sets. The training data 404 can include text corpora, which can include pairs of natural language text (which can include natural language fragments, phrases, sentences, statements, queries, and the like) and corresponding SQL statements. The text in the training data 404 can be annotated and/or unannotated. The training data 404 can be obtained from publicly available datasets. Several datasets are publicly available for training purposes such as Common Crawl, RefinedWeb, The Pile, C4, StarCoder, BookCorpus, ROOTS, Wikipedia, Red Pajama, SParC, CoSQL, MultiSpider, and others. The dataset preparer 406 can access the training data 404 from one or more sources such as a database (not shown), a computing system (e.g., data preprocessing subsystem), and the like. In some instances, the training data 404 can be provided by a client or customer.

The model trainer 408 uses the training data 404 to convert the transformer 410 into a language model 418. In some instances, the transformer 410 includes an encoder-decoder network that includes an encoder and decoder. In other instances, the transformer 410 includes a decoder network that includes the decoder. The encoder can include several layers including recurrent layers, feedforward layers, embedding layers, and attention layers and can perform an embedding procedure to transform the natural language text of the training data 404 into state and context vectors for input into the decoder. The decoder can include several layers including recurrent layers, feedforward layers, embedding layers, attention layers, and output layers and can decode the state and context vectors and/or other information into text and logical forms such as SQL statements.

To convert the transformer 410 into the language model 418, the model trainer 408 can perform a hyperparameter tuning process and a training process. The hyperparameter tuning process selects hyperparameters for configuring the language model 418. Hyperparameters are settings that can be tuned or optimized to control the behavior of the model. Most models explicitly define hyperparameters that control different aspects of the models such as memory or cost of execution. However, additional hyperparameters may be defined to adapt a model to a specific scenario. For example, additional hyperparameters may be defined to determine the number of hidden units or layers of a model, the learning rate of a model, the convolution kernel width, and/or the number of parameters for a model. The training process selects model parameters (e.g., weights and/or biases) for further configuring the language model 418 by iteratively performing operations of inputting batches or training sets of the training data 404 into the transformer 410 and finding a set of model parameters (e.g., weights and/or biases) that maximizes or minimizes an objective function. The objective function can be constructed to measure the difference between outputs inferred using the transformer 410 with different sets of model parameters and reconstructions of the batches of input training data 404 and/or annotated training data 404.

The trained language model 418 can include a vocabulary of tokens from which tokens for an output sequence of tokens generated by the trained language model 418 can be identified. Tokens included in the vocabulary can represent natural words, sub-words, character-based n grams, single characters. In some implementations, the trained language model 418 can include a vocabulary of 32,000 tokens from which tokens for the output sequence can be identified. In some implementations, the trained language model 418 can convert an input (e.g., an input prompt or text) into an input sequence of tokens and predict an output sequence of tokens for the input sequence of tokens. The trained language model 418 can predict the tokens of the output sequence of tokens by computing a probability distribution over the vocabulary of the trained language model 418 (e.g., over the vocabulary of 32,000 tokens) for each respective token to be included in the output sequence of tokens. The probability distribution can be computed for a later token of the output sequence of tokens based on the context of the preceding (and previously) predicted tokens of the output sequence of tokens. In some implementations, the number of tokens included in the vocabulary for a trained language model can be variable. That is, each language model trained during the training process can have a different vocabulary including different numbers of tokens. For example, in some implementations, the vocabulary of tokens for a language model trained at the training stage 402 can include 16,000 tokens from which tokens for an output sequence can be identified. In this way, a language model trained at the training stage 402 can predict a sequence of output tokens for different use cases (e.g., different natural language prompts for different topics and/or subjects) and generalize well to new and unseen use cases (e.g., predicting Python statements, predicting Java scripts, and the like).

The trained language model 418 can be output or deployed to the inference stage 412 where it can be used to predict logical forms such as SQL statements for input natural language prompts. Prior to being output or deployed, the trained language model 418 can be tested or validated by iteratively performing operations of inputting validation sets of the training data 404 into the trained language model 418 and evaluating performance of the trained language model 418 using a validation technique such as K-Fold Cross-Validation, Leave-one-out Cross-Validation, Leave-one-group-out Cross-Validation, Nested Cross-Validation, or the like. Once the trained language model 418 has been tested and/or validated, it can be output or deployed to the inference stage 412.

The inference stage 412 includes a predictor 416 that is configured to execute processes for accessing prompt information 414 generated by the prompt generator 424 at the prompt generation stage 422, inputting the prompt information into the language model 418, generating, using the language model 418, a SQL statement 420 for the prompt information 414, and outputting or providing the SQL statement 420 to the query stage 426. The prompt information 414 can include one or more queries and instructions and database schema information for a database such as database 430. The one or more queries and instructions can be in the form of natural language fragments, phrases, sentences, statements, and the like. The database 430 can be a relational database and/or non-relational database that includes one or more tables with each table including one or more columns with each column including one or more values. Each table and column of the relational database can be named with unique identifiers, each of which can include one or more words. The database schema information for the database 430 can define how data is organized within the database and can include logical constraints such as table names, fields, data types, and the relationships between these entities. In some implementations, the query and/or the database schema information can be received from a user device (not shown) and stored in a storage device (not shown). In some implementations, the prompt generator 424 can access the query and the database schema information or portions thereof, generate prompt information 414 by combining the query and the database schema information, and provide the prompt information 414 to the inference stage 412 (e.g., via an application programming interface of the trained language model 418).

In order to predict the SQL statement 420 for the prompt information 414, the trained language model 418 can convert the prompt information 414 to an input sequence of tokens and predict an output sequence of tokens for the input sequence of tokens. The output sequence of tokens can be identified from the vocabulary of the tokens for the language model 418 (e.g., from the 32,000 token vocabulary). For example, the trained language model 418 can predict the tokens of the output sequence of tokens by computing a probability distribution over the vocabulary of tokens for each respective token to be included in the output sequence of tokens. The probability distribution can be computed for a later token of the output sequence of tokens based on the context of the preceding (and previously) predicted tokens of the output sequence of tokens. The output sequence of tokens can be decoded into the SQL statement 420, which can be output or provided to the query stage 426. The query stage 426 includes a query executor 428 that is configured to execute the SQL statement 420 on a system such as database 430 to obtain a result 432 (e.g., an answer to a query within prompt information 414).

The inference stage 412 and query stage 428 can be implemented as part of an artificial intelligence-based solution such as the digital assistant or chatbot as described with respect to FIGS. 1-3 and/or as part of a cloud service implemented using a cloud infrastructure as described with respect to FIGS. 7-11. For example, the inference stage 412 and the query stage 428 can be deployed within a chatbot system (e.g., as part of a skill bot) for generating logical forms from natural language prompts. In some instances, a prompt may be received and/or generated (e.g., by a skill bot), the prompt may be tokenized into tokens, and the tokens may be analyzed by the trained language model 418 to predict an output sequence of tokens, which can be decoded into an output statement for a programming language such as SQL, Python, Jave, and the like. The output statement can be used to query the database 432 to obtain a result 434. The result 434 can be used to generate a response (e.g., generate dialogue with the user based on the information retrieved from the database 432) which can then be displayed, on a display device of the system or a client device (not shown) along with the prompt, other information, or any combination thereof.

In some implementations, rather than building and training models, the computing system 400 can access a pre-trained language model and output or deploy the pre-trained language model to the inference stage 412. The pre-trained language model can be an auto-encoder based language model, a sequence-to-sequence-based language model, a transformer-based language model, a recursive neural network-based language model, and the like. An example of a pre-trained language model which can be accessed by the computing system 400 and output or deployed to the inference stage 412 is the pre-trained LLAMA model. Additional information for the LLAMA model is found in "LLaMA: Open and Efficient Foundation Language Models" by Touvron et al., published in arXiv preprint arXiv: 2302.13971, 2023, the entire contents of which is hereby incorporated by reference as if fully set forth herein.

While not explicitly shown, it will be appreciated that the system 400 may further include a developer device associated with a developer. Communications from a developer device to components of the system 400 may indicate what types of input information, utterances, and/or database schema are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

As discussed above, due in part to the size of a vocabulary for a LM, the LM can suffer from hallucinations and/or may not be robust to different kinds of input. As such, the SQL statement 420 may include errors such as referencing non-existent database tables or attributes and/or include incorrect operators. To reduce hallucinations and increase robustness, techniques such as one-shot prompting, few-shot prompting, context injection, grounding, and prompt augmentation can be used. However, even using these techniques, output statements generated by the LM can still be undesirable.

To overcome this challenge and others, the techniques described herein utilize a vocabulary that is dynamic in that it is constructed from an input prompt, database schema information for a database to be queried, and programming language information for a programming language to be used for querying the database to condition a language model to predict an output statement in the programming language. The dynamic vocabulary can be included in prompt information that is provided to the language model. A dynamic vocabulary can be constructed for each input prompt. Each dynamic vocabulary can include a different number of tokens. The number of tokens in each dynamic vocabulary can be less than the number of tokens included in the vocabulary of the language model (i.e., the vocabulary established during the training process). By utilizing a dynamic vocabulary, the language model can be conditioned to predict tokens for the output statement that are contextually consistent with the tokens included the dynamic vocabulary. Prompt information that includes a prompt along with a dynamic vocabulary for the prompt can be provided to the language model, which in turn can predict tokens for an output statement that are contextually consistent with the tokens included the dynamic vocabulary. In this way, by taking into account the contents of the input prompt and domain-specific information such as programming language information and database schema information, the language model can be conditioned to predict a next token in an output sequence of tokens based on tokens included in the dynamic vocabulary thereby increasing model robustness and reducing hallucinations can be improved. As such, accuracy of results from queries executed using these output statements can be improved.

In making the predictions based on the dynamic vocabulary, attention of the language model can be focused away from non-useful tokens (i.e., those not included in the dynamic vocabulary) while attention can be focused on tokens of the dynamic vocabulary. By taking into account the contents of the prompt and the dynamic vocabulary, the language can be conditioned to predict a next token in an output sequence of tokens based on tokens included in the dynamic vocabulary. Additionally, by focusing on the tokens of the dynamic vocabulary, the space/range of tokens on which the LM pays attention to in making its predictions is reduced, which in turn can increase prediction speed of the LM while limiting the ability of the LM to predict tokens that are inconsistent with the desired domain/use case. Using the techniques described herein, hallucinations can be reduced while model robustness can be improved. As such, accuracy of downstream tasks such as the results from queries executed using these output statements can be improved.

Figure 5:
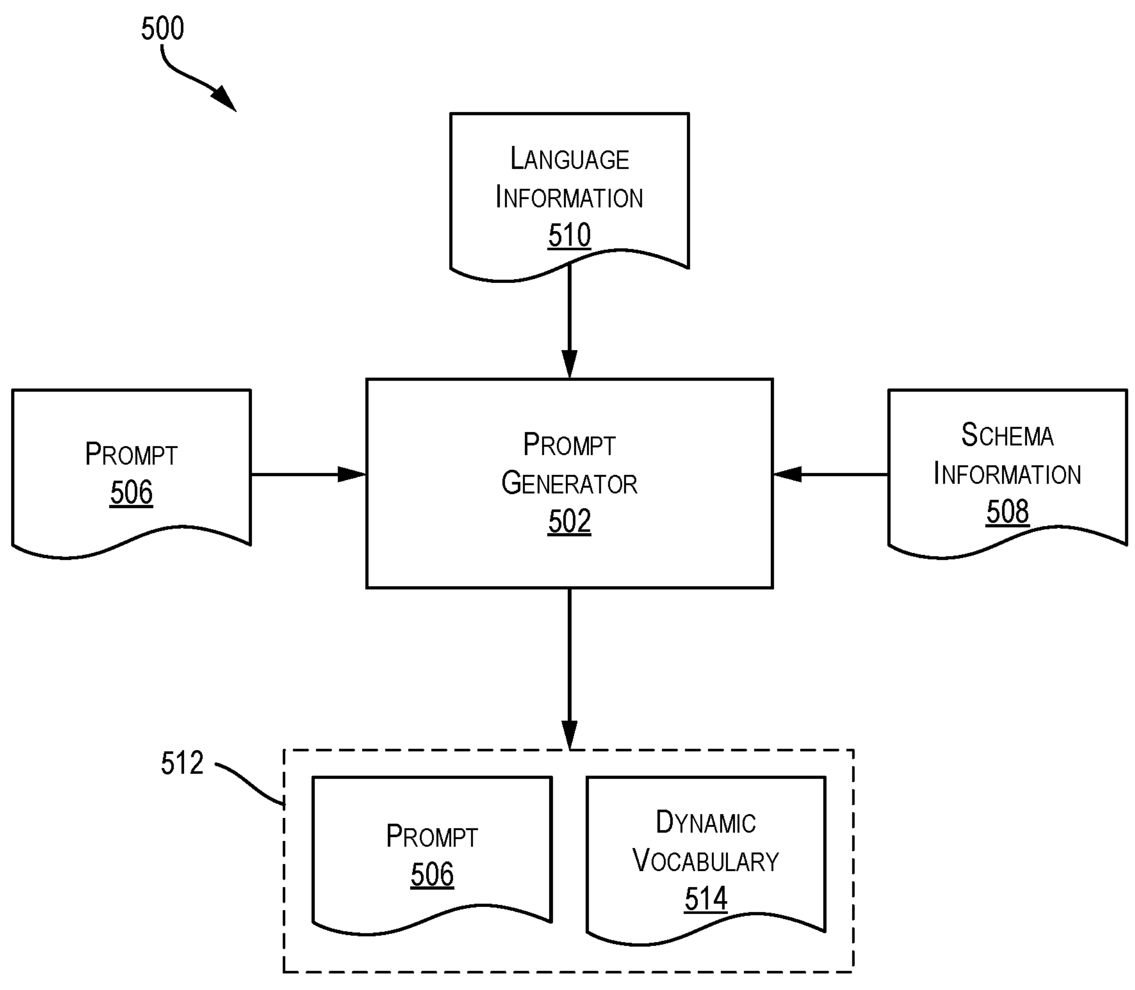
FIG. 5 is a simplified block diagram of a prompt generation system for generating prompt information for conditioning a language model according to certain embodiments.

FIG. 5 shows a block diagram illustrating aspects of a prompt generation system 500. The prompt generation system 500 includes a prompt generator 502. In some implementations, the prompt generator 502 can serve as the prompt generator 424 of the prompt generation stage 422 of the computing system 400. The prompt generator 502 can be configured to generate prompt information 512. The prompt information 512 can be provided to the language model 418 of the computing system (e.g., via an application programming interface of the language model 418) which can then predict an output statement by analyzing the prompt information 512. The prompt information 512 can include an input prompt 506 and a dynamic vocabulary 514. As discussed above, the input prompt 506 and/or the dynamic vocabulary 514 can condition the language model 418 to predict the output statement.

To generate the prompt information 512, the prompt generator 502 can be configured to: (i) access an input prompt 506, database schema information 508 for a database (e.g., database 430) to be queried, and programming language information 510 for a programming language to be used to query the database (e.g., SQL, Python, Java, and the like); (ii) generate a dynamic vocabulary 514 from the input prompt 506, database schema information 508, and programming language information 510; and (iii) combine the input prompt 506 and dynamic vocabulary 514 to create the prompt information 512.

The input prompt 506, database schema information 508, and programming language information 510 can be stored in one or more storage devices (not shown) or databases (not shown) and accessed and/or retrieved by the prompt generator 502. In some implementations, the input prompt 506, database schema information 508 and programming language information 510 can be received from a user device (not shown) and stored in the one or more storage devices and/or databases. In some implementations, the prompt generator 502 can access or retrieve portions of the input prompt 506, database schema information 508, and programming language information 510.

The input prompt 506 can include one or more natural language fragments, phrases, sentences, statements, and the like. In some implementations, the input prompt 506 represents a request for information that is stored in a database such as database 430. For example, the input prompt 506 may represent a request for information from a retail store's database about a retail store's customers in a particular demographic and may include a natural language statement such as "Provide a list of sales by customer segment."

In some implementations, the input prompt 506 can include one or more conditions in which the information requested should be retrieved. Examples of conditions include, but are not limited to, date, time, geographic region, item categories, and so on. For example, for an input prompt that includes the request "Provide a list of sales by customer's aged 20 and over," the portion of the request "aged 20 and over" represents an age condition in which the information requested should be retrieved (e.g., sales by customers of a certain age and over rather than all customers). In another example, for an input prompt that includes the request "Provide a list of managers hired in California," the portion of the request "in California" represents a geographic condition in which the information requested should be retrieved (e.g., managers hired in California rather than all managers hired). In some implementations, the input prompt 506 can include one or more terms that identify one or more conditions in which the requested information should be retrieved. Examples of terms that can be included in the input prompt 506 include, but are not limited to, "where," "condition," "unless," and the like (e.g., "Show me all employees under the condition they live in Los Angeles"). In some implementations, the input prompt 506 can include a labeled section that identifies one or more conditions in which the requested information should be retrieved. For example, the input prompt 506 can include a section labeled "Conditions:" followed by one or more conditions in which the requested information should be retrieved.

In some implementations, the input prompt 506 can identify a task to be performed. Examples of tasks to be performed include, but are not limited to, requests to retrieve information, requests to generate information, translations, sentiment analysis, and others. For example, the input prompt 506 can include the natural language statement, "Act as if you are a text-to-code converter that produces a code-like statement for a question based on the following information," which identifies the task as text-to-code translation task. In another example of a translation task, the input prompt 506 can include the natural language statement, "Act as if you are a text-to-SQL converter that produces a SQL-like answer for a question based on a schema." In some implementations, for text-to-code translation tasks (e.g., text-to-SQL, text-to-Python, and the like), the input prompt 506 can include one or more terms that identify the programming language in which the output statement predicted by the language model 418 should be in. For example, the input prompt 506 can include the term "SQL" or "Python" to indicate that the output statement should be a SQL statement (e.g., "Using SQL, show me all employees under age 25") or a Python statement (e.g., "Using Python, show me all employees under 25").

In some implementations, the input prompt 506 can include information describing the architecture, organization, and/or structure of the database to be queried. In some implementations, the input prompt 506 can include a portion or all of the database schema the database schema information 508 for the database that is to be queried.

The database schema information 508 can define how data is organized within the database and can include logical constraints such as table names, attributes, column names, fields, data types, values, and the relationships between these entities. In some implementations, the database can be a relational database that includes one or more tables with each table including one or more columns with each column including one or more rows of values. Each table and column of the relational database can be named with unique identifiers, each of which can include one or more words. For example, a retail store's database can include the column names "Customer_First_Name; Customer_Last_Name; Customer_Age; Customer_Zipcode; Purchase_Date; Item_Category" and the database schema information for the retail store's database can define how the columns are organized within the database (e.g., column order) and the column names.

The programming language information 510 for the programming language to be used to query the database can include a set of keywords for the programming language. Examples of programming languages include, but are not limited to, SQL, Python, Java, and the like. As used herein, a keyword for a programming language refers to a word in the programming language that is used by the programming language to perform an operation. As such, the set of keywords for the programming language can represent operations that can be performed by the programming language. In some implementations, in the case of the SQL programming language, the set of keywords for SQL can include 44 keywords. For example, for the SQL programming language, the keyword SELECT which represents an operation to select data from a database and the keyword FROM which represents an operation that specifies which table to select the data from can be included in the set of keywords.

To generate the dynamic vocabulary 514, the prompt generator 502 can be configured to: (i) tokenize the set of keywords in the programming language information 510; (ii) extract and tokenize a portion or all of the database schema information 508 for the database that is to be queried; (iii) extract and tokenize any conditions included in the input prompt 506; and (iv) combine the tokens to create the dynamic vocabulary 514. The number of tokens in the dynamic vocabulary 514 can be less than the number of tokens included in the vocabulary of the language model (i.e., the vocabulary established during the training process) such as the 32,000 token vocabulary of the trained language model 418.

In some implementations, the portion of the database schema information 508 that is extracted can correspond to the portion of the database schema information 508 included in the input prompt 506. In some implementations, to extract any conditions included in the input prompt 506, the prompt generator 502 can be configured to analyze the input prompt 506 to identify any conditions associated with the input prompt 506. In some implementations, the prompt generator 502 can analyze the input prompt 506 by searching the contents of the input prompt 506 for a conditions section and/or terms associated with conditions in the input prompt 506. For example, the prompt generator 502 can search the input prompt 506 for the phrase "Conditions:" and the terms such as "where," "condition," "unless," and the like. In some implementations, the prompt generator 502 can utilize a rule-based and/or named-entity recognition-based approach to identify portions of the input prompt 506 that are associated with one or more conditions. For example, using a rule-based and/or named-entity recognition-based approach, the prompt generator 502 can identify that the portion of a request included in the input prompt 506 that includes the phrase "in California" represents a geographic condition in which the information requested should be retrieved.

Illustrative Methods

FIG. 6 illustrates an example process 600 for generating prompt information for conditioning a language model. The processing depicted in FIG. 6 may be implemented in software (e.g., code, instructions, a program) executed by one or more processing units (e.g., one or more processors, cores) of the respective systems, hardware, or combinations thereof described throughout. The software may be stored on a non-transitory storage medium (e.g., on a memory device). Although the methods presented in FIG. 6 depict the various processing steps occurring in a particular sequence or order, this is not intended to be limiting. In certain alternative embodiments, the steps may be performed in parallel and/or in a different order. In certain embodiments, such as in the embodiments depicted in FIGS. 1-5, the processing depicted in FIG. 6 may be performed by the master bot system 200 and/or the model system 400. In other embodiments, such as in the embodiments depicted in FIGS. 5 and 7-11, the processing depicted in FIG. 6 may be offered as a cloud service and performed by the infrastructure as a service (IaaS) architecture 700.

At block 602, an input prompt, database schema information for a database to be queried, and programming language information for a programming language to be used to query the database are accessed.

At block 604, input information for a machine learning model configured to predict a statement is generated. The input information includes the input prompt and dynamic vocabulary. The dynamic vocabulary includes a set of tokens that include one or more tokens associated with the programming language, one or more tokens associated with the database schema information, and one or more tokens associated with at least one condition of the input prompt.

To generate the dynamic vocabulary, a set of keywords in the programming language information can be tokenized; (ii) a portion or all of the database schema information for the database that is to be queried can be extracted and tokenized; (iii) any conditions included in the input prompt can be extracted and tokenized; and (iv) the tokens can be combined to create the dynamic vocabulary. The number of tokens in the dynamic vocabulary can be less than the number of tokens included in the vocabulary of the language model. In some implementations, the portion of the database schema information that is extracted can correspond to a portion of the database schema information included in the input prompt. In some implementations, to extract any conditions included in the input prompt, the input prompt can be analyzed to identify any conditions associated with the input prompt by searching the contents of the input prompt for a conditions section and/or terms associated with conditions in the input prompt. In some implementations, a rule-based and/or named-entity recognition-based approach can be used to identify portions of the input prompt that are associated with one or more conditions.

At block 606, using the machine learning model, an output statement for the input prompt is predicted based on the input information. The output statement includes a plurality of tokens, and at least one token of the plurality of tokens is selected from the set of tokens. In some implementations, the output statement can be a SQL statement.

To predict the output statement, the language model can convert the input information to an input sequence of tokens and predict an output sequence of tokens for the input sequence of tokens. The output sequence of tokens can be identified from the dynamic vocabulary and/or the vocabulary of the tokens for the language model. The probability distribution can be computed for a later token of the output sequence of tokens based on the context of the preceding (and previously) predicted tokens of the output sequence of tokens. The output sequence of tokens can be decoded into the output statement.

At block 608, using the output statement, a query is executed on the database associated with the database schema information to retrieve a result for the query.

At block 610, the result for the query is provided to a user device. In some implementations, providing the result for the query to the user device includes incorporating the result for the query in a dialog between the user device and a skill bot and presenting the dialog on a display of the user device. The flow can return to block 602.

In some implementations, upon return to block 602, second input information is generated for the machine learning model. The second input information includes a second input prompt and a second set of tokens. The second set of tokens includes one or more tokens associated with the programming language, one or more tokens associated with second database schema information, and one or more tokens associated with at least one condition of the second input prompt. Using the machine learning model, a second output statement for the second input prompt is predicted based on the second input information. The second output statement includes a second plurality of tokens and at least one token of the second plurality of tokens is selected from the second set of tokens. In some implementations, a number of tokens included in the first set of tokens is different from a number of tokens in the second set of tokens.

Illustrative Systems

The term cloud service is generally used to refer to a service that is made available by a cloud service provider (CSP) to users (e.g., cloud service customers) on demand (e.g., via a subscription model) using systems and infrastructure (cloud infrastructure) provided by the CSP. Typically, the servers and systems that make up the CSP's infrastructure are separate from the user's own on-premise servers and systems. Users can thus avail themselves of cloud services provided by the CSP without having to purchase separate hardware and software resources for the services. Cloud services are designed to provide a subscribing user easy, scalable access to applications and computing resources without the user having to invest in procuring the infrastructure that is used for providing the services.

There are several cloud service providers that offer various types of cloud services. As discussed herein, there are various types or models of cloud services including IaaS, software as a service (SaaS), platform as a service (PaaS), and others. A user can subscribe to one or more cloud services provided by a CSP. The user can be any entity such as an individual, an organization, an enterprise, and the like. When a user subscribes to or registers for a service provided by a CSP, a tenancy or an account is created for that user. The user can then, via this account, access the subscribed-to one or more cloud resources associated with the account.

As noted above, IaaS is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
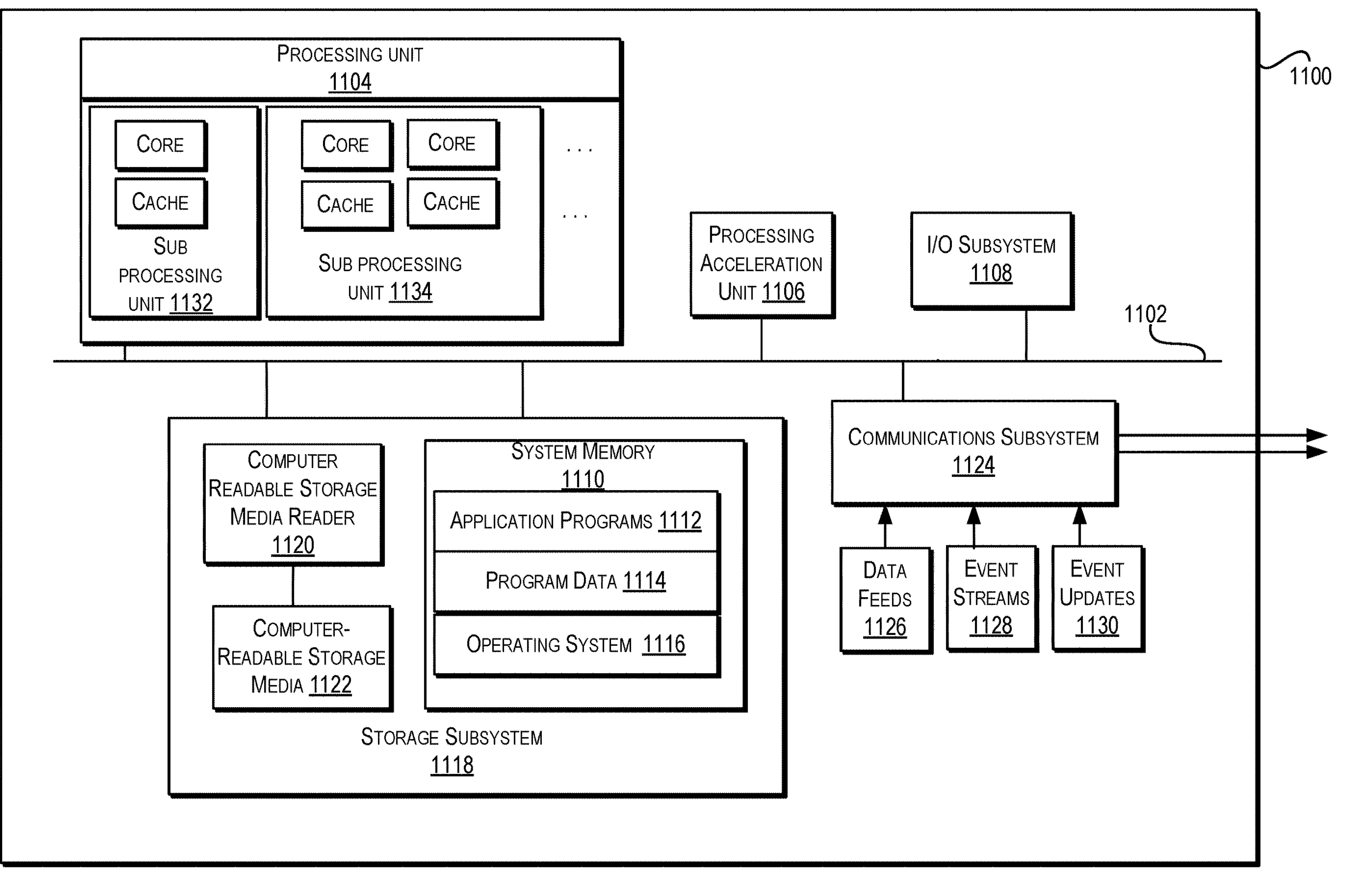
FIG. 11 is a block diagram illustrating an example computer system according to certain embodiments.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some, or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

generating, by a computing system, input information for a machine learning model configured to predict a statement, wherein the input information comprises an input prompt and a dynamic vocabulary derived from the input prompt and separate from the input prompt, wherein the dynamic vocabulary is further derived from a programming language and database schema information, and wherein a set of tokens of the dynamic vocabulary comprises one or more tokens associated with the programming language, one or more tokens associated with the database schema information, and one or more tokens associated with at least one condition of the input prompt;

predicting, by the computing system and using the machine learning model, an output statement for the input prompt based at least in part on the input information, wherein the output statement comprises a plurality of tokens, and wherein at least one token of the plurality of tokens is selected from the set of tokens;

executing, by the computing system and using the output statement, a query on a database associated with the database schema information to retrieve a result for the query; and providing, by the computing system, the result for the query to a user device.

2. The computer-implemented method of claim 1, wherein the input information is first input information, wherein the input prompt is a first input prompt, wherein the set of tokens is a first set of tokens, wherein the database schema information is first database schema information, wherein the output statement is a first output statement, and wherein the plurality of tokens is a first plurality of tokens, the method further comprising:

generating, by the computing system, second input information for the machine learning model, wherein the second input information comprises a second input prompt and a second set of tokens, and wherein the second set of tokens comprises one or more tokens associated with the programming language, one or more tokens associated with second database schema information, and one or more tokens associated with at least one condition of the second input prompt; and predicting, by the computing system and using the machine learning model, a second output statement for the second input prompt based at least in part on the second input information, wherein the second output statement comprises a second plurality of tokens, and wherein at least one token of the second plurality of tokens is selected from the second set of tokens.

3. The computer-implemented method of claim 2, wherein a number of tokens included in the first set of tokens is different from a number of tokens in the second set of tokens.

4. The computer-implemented method of claim 1, wherein the machine learning model comprises a vocabulary, and wherein a number of tokens included in the set of tokens is less than a number of tokens included in the vocabulary.

5. The computer-implemented method of claim 1, wherein at least one token of the one or more tokens associated with the at least one condition of the input prompt corresponds to a term included in the input prompt.

6. The computer-implemented method of claim 1, wherein at least one token of the one or more tokens associated with the at least one condition of the input prompt is generated using a rules-based approach and/or a named-entity recognition-based approach.

7. A system comprising:

one or more processors; and one or more computer-readable media storing instructions which, when executed by the one or more processors, cause the system to perform operations comprising:

generating input information for a machine learning model configured to predict a statement, wherein the input information comprises an input prompt and a dynamic vocabulary derived from the input prompt and separate from the input prompt, wherein the dynamic vocabulary is further derived from a programming language and database schema information, and wherein a set of tokens of the dynamic vocabulary comprises one or more tokens associated with the programming language, one or more tokens associated with the database schema information, and one or more tokens associated with at least one condition of the input prompt;

predicting, using the machine learning model, an output statement for the input prompt based at least in part on the input information, wherein the output statement comprises a plurality of tokens, and wherein at least one token of the plurality of tokens is selected from the set of tokens;

executing, using the output statement, a query on a database associated with the database schema information to retrieve a result for the query; and providing the result for the query to a user device.

8. The system of claim 7, wherein the input information is first input information, wherein the input prompt is a first input prompt, wherein the set of tokens is a first set of tokens, wherein the database schema information is first database schema information, wherein the output statement is a first output statement, and wherein the plurality of tokens is a first plurality of tokens, the operations further comprising:

generating second input information for the machine learning model, wherein the second input information comprises a second input prompt and a second set of tokens, and wherein the second set of tokens comprises one or more tokens associated with the programming language, one or more tokens associated with second database schema information, and one or more tokens associated with at least one condition of the second input prompt; and predicting, using the machine learning model, a second output statement for the second input prompt based at least in part on the second input information, wherein the second output statement comprises a second plurality of tokens, and wherein at least one token of the second plurality of tokens is selected from the second set of tokens.

9. The system of claim 8, wherein a number of tokens included in the first set of tokens is different from a number of tokens in the second set of tokens.

10. The system of claim 7, wherein the machine learning model comprises a vocabulary, and wherein a number of tokens included in the set of tokens is less than a number of tokens included in the vocabulary.

11. The system of claim 7, wherein at least one token of the one or more tokens associated with the at least one condition of the input prompt corresponds to a term included in the input prompt.

12. The system of claim 7, wherein at least one token of the one or more tokens associated with the at least one condition of the input prompt is generated using a rules-based approach and/or a named-entity recognition-based approach.

13. The system of claim 7, wherein the providing the result for the query to the user device comprises incorporating the result for the query in a dialog between the user device and a skill bot and presenting the dialog on a display of the user device.

14. One or more non-transitory computer-readable media storing instructions which, when executed by one or more processors, cause a system to perform operations comprising:

generating input information for a machine learning model configured to predict a statement, wherein the input information comprises an input prompt and a dynamic vocabulary derived from the input prompt and separate from the input prompt, wherein the dynamic vocabulary is further derived from a programming language and database schema information, and wherein a set of tokens of the dynamic vocabulary comprises one or more tokens associated with the programming language, one or more tokens associated with the database schema information, and one or more tokens associated with at least one condition of the input prompt;

predicting, using the machine learning model, an output statement for the input prompt based at least in part on the input information, wherein the output statement comprises a plurality of tokens, and wherein at least one token of the plurality of tokens is selected from the set of tokens;

executing, using the output statement, a query on a database associated with the database schema information to retrieve a result for the query; and providing the result for the query to a user device.

15. The one or more non-transitory computer-readable media of claim 14, wherein the input information is first input information, wherein the input prompt is a first input prompt, wherein the set of tokens is a first set of tokens, wherein the database schema information is first database schema information, wherein the output statement is a first output statement, and wherein the plurality of tokens is a first plurality of tokens, the operations further comprising:

generating second input information for the machine learning model, wherein the second input information comprises a second input prompt and a second set of tokens, and wherein the second set of tokens comprises one or more tokens associated with the programming language, one or more tokens associated with second database schema information, and one or more tokens associated with at least one condition of the second input prompt; and predicting, using the machine learning model, a second output statement for the second input prompt based at least in part on the second input information, wherein the second output statement comprises a second plurality of tokens, and wherein at least one token of the second plurality of tokens is selected from the second set of tokens.

16. The one or more non-transitory computer-readable media of claim 15, wherein a number of tokens included in the first set of tokens is different from a number of tokens in the second set of tokens.

17. The one or more non-transitory computer-readable media of claim 14, wherein the machine learning model comprises a vocabulary, and wherein a number of tokens included in the set of tokens is less than a number of tokens included in the vocabulary.

18. The one or more non-transitory computer-readable media of claim 14, wherein at least one token of the one or more tokens associated with the at least one condition of the input prompt corresponds to a term included in the input prompt.

19. The one or more non-transitory computer-readable media of claim 14, wherein at least one token of the one or more tokens associated with the at least one condition of the input prompt is generated using a rules-based approach and/or a named-entity recognition-based approach.

20. The computer-implemented method of claim 1, wherein the providing the result for the query to the user device comprises incorporating the result for the query in a dialog between the user device and a skill bot and presenting the dialog on a display of the user device.

* * * * *